UNITED STATES PATENT OFFICE.

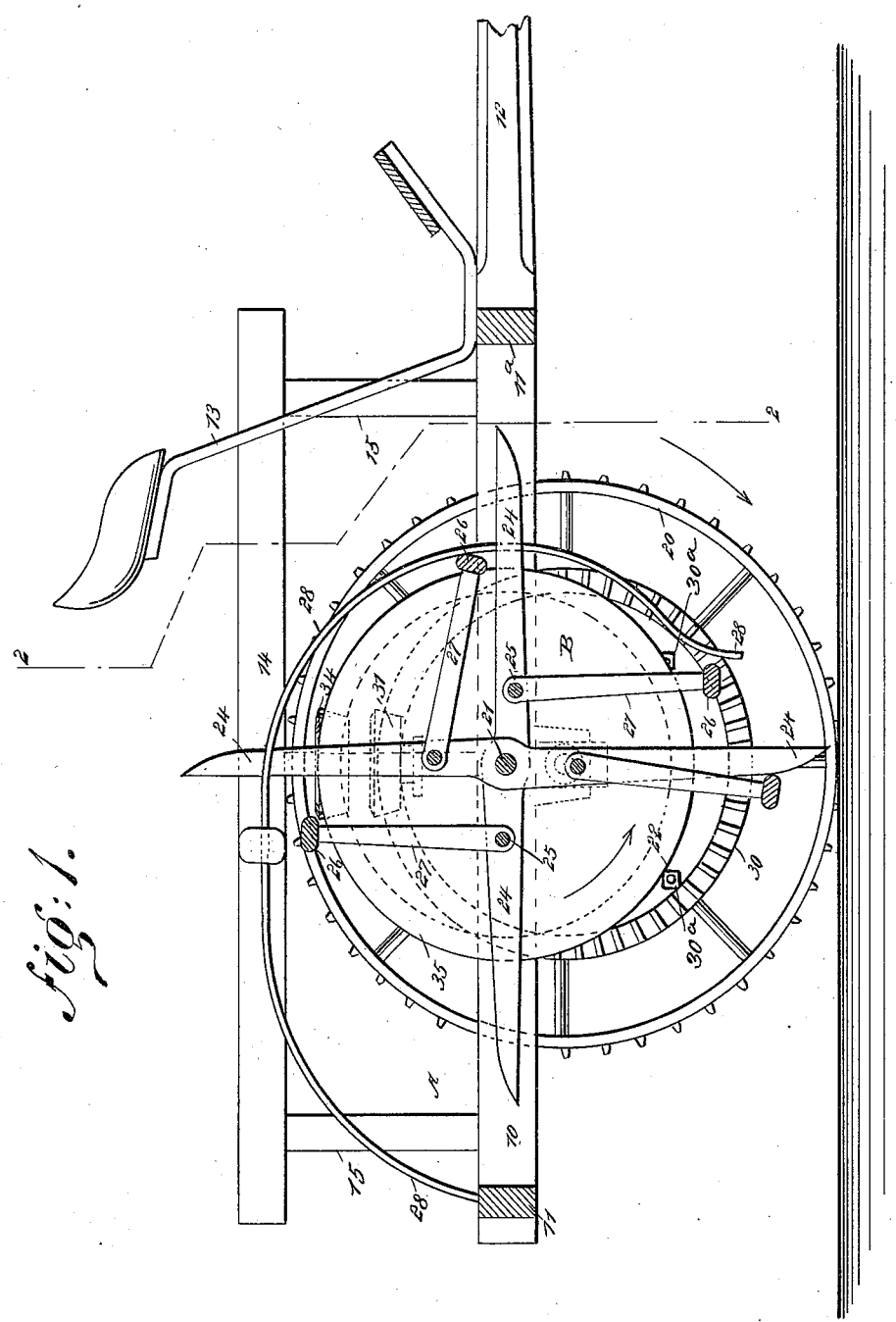

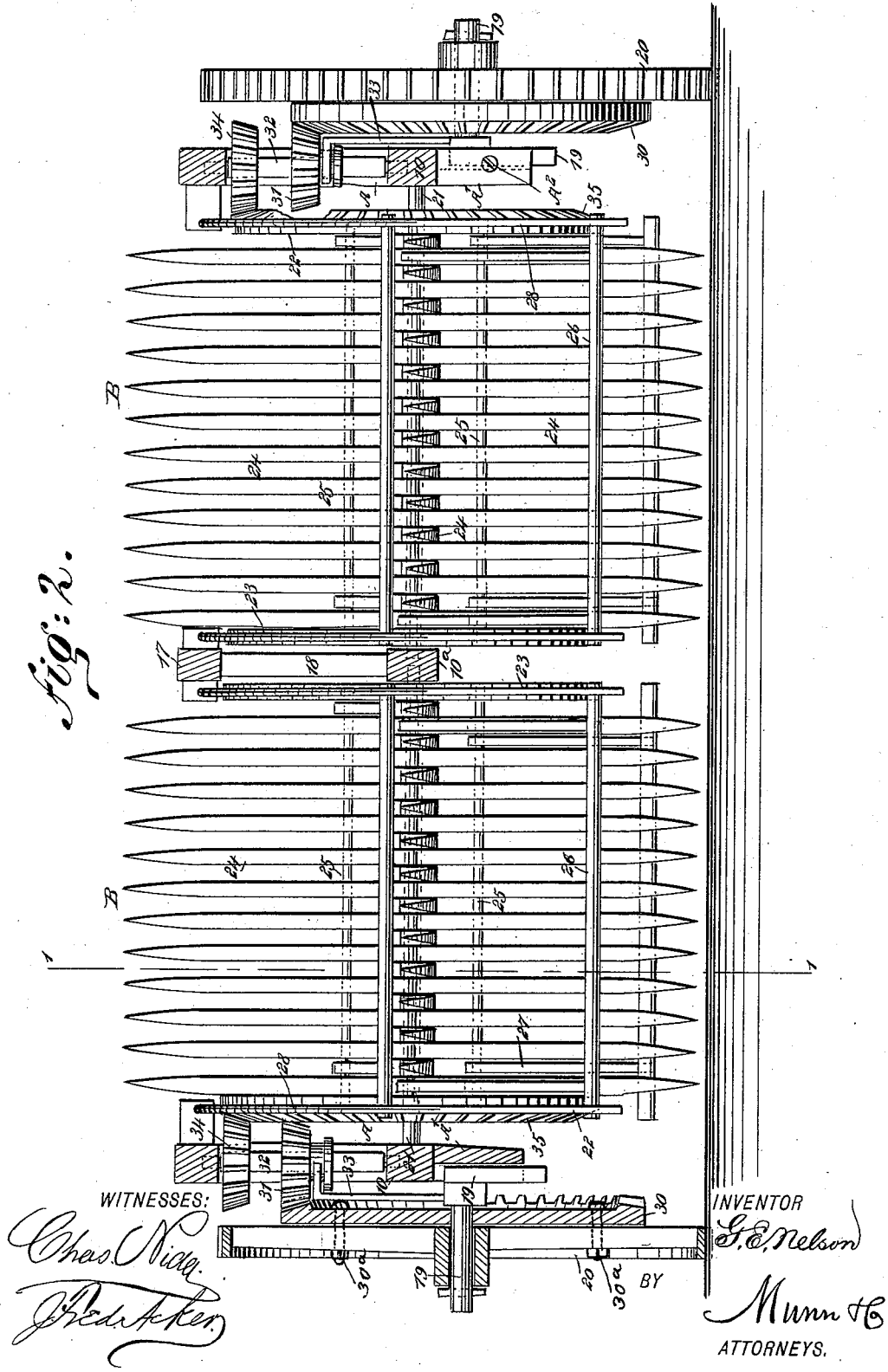

GEORGE EMANUEL NELSON, OF DILLON, MONTANA.

MACHINE FOR TURNING SWATHS.

SPECIFICATION forming part of Letters Patent No. 557,417, dated March 31, 1896.

Application filed June 20, 1895. Serial No. 553,437. (No model.)

*To all whom it may concern:*

Be it known that I, GEORGE EMANUEL NELSON, of Dillon, in the county of Beaver Head and State of Montana, have invented a new and Improved Machine for Turning Swaths, of which the following is a full, clear, and exact description.

My invention relates to a machine adapted to travel behind a mowing-machine and which will be so constructed that it will take up one or more, usually two, swaths of cut hay or grass left by the advanced mowing-machine and turn the green material over, bringing that part which was formerly underneath upward and exposed to the sun.

A further object of the invention is to provide a machine of this character which as it advances will not only turn over each swath, but will leave the swaths in practically the same position relative to each other that they were before being lifted and turned.

The machine is especially adapted for turning over swaths of clover, alfa, and similar grasses, since when the clover is cut it falls from the mower with the leaves and blossoms on top, the coarse juicy stems being underneath, and therefore when the clover is left in this position until the stems are dry enough to stack the leaves and blossoms will have dried to such an extent as to have fallen off; but when the swath is turned over the thicker and coarser portions of the grass are brought directly under the influence of the sun and the more delicate portions are protected, enabling them to dry correspondingly to the thicker portions.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1 is a vertical longitudinal section through the machine, the said section being taken practically on the line 1 1 of Fig. 2; and Fig. 2 is a partial front elevation of the machine and a partial vertical transverse section, the section being taken on the line 2 2 of Fig. 1.

In carrying out the invention the frame A consists of a substantial base, comprising side pieces 10, an intermediate bar $10^a$ parallel with the sides, and end bars 11 and $11^a$, the tongue 12 being attached to the forward end bar, and a railing located at the sides of the bed-section of the frame, comprising top bars 14, supported by suitable standards 15, while a light railing 17 is constructed on the center bar $10^a$, as shown in Fig 2, supported by standards 18.

The bed-section of the frame is provided at or about the central portion of each side with a pedestal A', each pedestal being grooved to receive the inner vertical member of the angular axles 19, and on each of these axles a ground-wheel 20 is mounted. The frame of the machine is raised or lowered as the character of the crop on the ground may demand by adjusting the axles 19, the latter being held in place by set-screws $A^2$ or their equivalents.

Within the frame two rotating rakes B are mounted having independent action, and these rakes, as well as their actuating devices, are by preference constructed similarly, as shown in Fig. 1. Each rake B comprises an axle 21 having its ends journaled in the side and central beams of the frame, heads 22 and 23 secured on the outer and inner ends of said axles, and series of rake teeth or bars held on said axles between said heads.

The rake teeth or bars consist of bars 24, pointed at opposite ends and slightly tapered or made wider toward their central portions, where they are bent so that their opposite points stand somewhat out of alinement, as seen in Fig. 1, and said rake teeth or bars 24 are perforated at their bent central parts to receive the axles 21 of the rakes B, whereon they are held, alternate bars in the series being set at right angles to the intervening bars, so that the rakes are each provided with four longitudinal series of teeth arranged at quadrants to each other, the teeth in alternate series being arranged out of alinement with and between the teeth of the intervening series, as shown in Fig. 1.

The teeth are held in fixed position through the medium of rods 25, which are passed through them at each side of the center and are secured in the heads of the rakes. Clamping or binding bars 26 are located between each row of teeth and extend over the heads of the rake. These clamping-bars have arms 27 attached to them near each end, the arms being pivoted on the cross-bars 25, and upon the upward movement of the rake these clamping or clasping bars are held from turning and are held adjacent to the teeth by means of guides 28 secured to the frame, one over each head, following the contour of the heads at the front, leaving them at the back, as shown in Fig. 1, since as the teeth pass from the lower fork to an upper horizontal position and from the upper horizontal to the upper vertical position it is the function of these clamping-bars to hold the cut hay on the rake-teeth, so that the swath as gathered up will be held in the position in which it was taken until delivered from the rakes at the back of the machine, whereupon said swath will have been completely turned over.

A seat 13 is supported on the front portion of the main frame. A driving-gear 30, preferably of the beveled type, is secured, by means of bolts 30$^a$ or the like, to each of the driving-wheels 20 and may be provided with any of the numerous forms of shifting devices for releasing them from the driving-wheels when desired. These large gears 30 mesh with beveled gears 31, held to slide as well as to turn upon vertical shafts 32 journaled in the sides of the frame, and each beveled gear is fitted with a sleeve, and these sleeves are connected by shifting bars 33 with the axle, so that when the axle is raised or lowered to bring the teeth of the rake nearer to or farther from the ground the pinions 31 will follow the gears 30, never being out of mesh.

A second pinion 34 is attached to the upper portion of each vertical shaft 32, and these upper pinions mesh with beveled gears 35, secured upon the outer faces of the outer heads of the rakes. Thus it will be observed that each rake is independent in its action and that when two rakes are used each rake will take up a swath. The gearing is such that as the driving-wheels turn forwardly with the machine the rakes move in a contrary or rearwardly direction.

Having thus described my invention, I claim as new and desire to secure by Letters Patent—

1. The combination of a frame having ground-wheels, an axle journaled in the frame, heads on said axle, rake-bars having opposite-pointed ends forming teeth and provided with central perforations to receive the axle, said rake-bars being arranged with their teeth forming parallel longitudinal series, the teeth of alternate series being arranged out of alinement with and between the teeth of those series with which they alternate, rods secured at their ends to the heads with their intermediate portions passing through the respective series of rake-bars on opposite sides of the axle, whereby the rake-bars are held in position, and means for driving said axle, substantially as set forth.

2. The combination of a frame having a vertically-adjustable axle, a ground-wheel on said axle, a gear connected to said axle and driven from the ground-wheel, a rake rotatively mounted in the frame, and having a gear, a shaft journaled in the frame between the rake and the gear on the axle, a gear on said shaft meshing with that on the rake, a gear adapted to rotate with and slide on said shaft and meshing with the gear on the axle, and a connection between said sliding gear and the axle whereby when said axle is adjusted vertically, said gear is slid longitudinally on the shaft, substantially as set forth.

GEORGE EMANUEL NELSON.

Witnesses:
  MATTHEW ORR,
  JOS. B. POINDEXTER.